United States Patent
Reznikov (10) Patent No.: US 8,045,326 B1
(45) Date of Patent: Oct. 25, 2011

(54) HARD DISK DRIVE BRACKET

(75) Inventor: Naum Reznikov, Fremont, CA (US)

(73) Assignee: Oracle America Inc., Redwood City, CA (US)

( * ) Notice: Subject to any disclaimer, the term of this patent is extended or adjusted under 35 U.S.C. 154(b) by 1699 days.

(21) Appl. No.: 10/883,509

(22) Filed: Jul. 1, 2004

(51) Int. Cl.
G06F 1/16 (2006.01)

(52) U.S. Cl. ......... 361/679.38; 361/679.33; 361/679.37; 312/223.1; 312/223.2; 312/333

(58) Field of Classification Search .................. None
See application file for complete search history.

(56) References Cited

U.S. PATENT DOCUMENTS

| | | |
|---|---|---|
| 3,193,342 A | 7/1965 | Sauter |
| 3,899,794 A | 8/1975 | Brown, Jr. |
| 4,365,831 A | 12/1982 | Bourne |
| 4,421,372 A | 12/1983 | Golden |
| 4,597,173 A | 7/1986 | Chino et al. |
| 4,778,401 A | 10/1988 | Boudreau et al. |
| 4,872,853 A | 10/1989 | Webster |
| 4,941,841 A | 7/1990 | Darden et al. |
| 5,003,431 A | 3/1991 | Imsdahl |
| 5,172,520 A | 12/1992 | Hostetler et al. |
| 5,222,897 A | 6/1993 | Collins et al. |
| 5,229,919 A | 7/1993 | Chen |
| 5,255,154 A | 10/1993 | Hosoi et al. |
| 5,332,306 A | 7/1994 | Babb et al. |
| 5,442,513 A | 8/1995 | Lo |
| 5,483,419 A | 1/1996 | Kaczeus, Sr. et al. |
| 5,504,648 A | 4/1996 | Honda et al. |
| 5,506,758 A | 4/1996 | Cromwell |
| 5,557,499 A | 9/1996 | Reiter et al. |
| 5,563,767 A | 10/1996 | Chen |
| 5,653,518 A | 8/1997 | Hardt |
| 5,654,873 A | 8/1997 | Smithson et al. |
| 5,673,172 A | 9/1997 | Hastings et al. |
| 5,691,859 A | 11/1997 | Ulrich et al. |
| 5,721,669 A * | 2/1998 | Becker et al. .................. 361/685 |
| 5,734,557 A | 3/1998 | McAnally et al. |
| 5,765,933 A | 6/1998 | Paul et al. |
| 5,980,281 A | 11/1999 | Neal et al. |
| 6,056,567 A | 5/2000 | Schell |
| 6,067,225 A | 5/2000 | Reznikov et al. |
| 6,193,339 B1 | 2/2001 | Behl et al. |
| 6,252,514 B1 | 6/2001 | Nolan et al. |
| 6,288,902 B1 | 9/2001 | Kim et al. |
| 6,371,433 B2 * | 4/2002 | Anderson et al. ............. 248/562 |
| 6,373,713 B1 | 4/2002 | Jensen et al. |
| 6,378,965 B1 * | 4/2002 | Reznikov et al. .......... 312/332.1 |
| 6,392,892 B1 * | 5/2002 | Sobolewski et al. .......... 361/724 |
| 6,413,122 B2 | 7/2002 | Fujioka |
| 6,433,825 B1 | 8/2002 | Cama et al. |
| 6,618,264 B2 | 9/2003 | Megason et al. |
| 6,762,934 B2 | 7/2004 | Kitchen et al. |
| 6,795,307 B2 | 9/2004 | Arbogast et al. |
| 6,798,650 B2 | 9/2004 | Reznikov et al. |
| 6,802,117 B2 | 10/2004 | Dalisay |

* cited by examiner

Primary Examiner — Jinhee Lee
Assistant Examiner — Anthony Q Edwards
(74) Attorney, Agent, or Firm — Meyertons, Hood, Kivlin, Kowert & Goetzel, P.C.

(57) ABSTRACT

A bracket for holding a disk drive or other subassembly in a chassis may have a pair of rails that lie under the disk drive when the disk drive is coupled to the bracket. A bracket assembly may include an injector pivotably coupled to a base of the bracket. The injector may include a pin that engages a slot in the chassis to urge the bracket assembly into the chassis. The injector and base may, include latch elements for latching the injector to the base. A latch element of the base may be integrally formed with a body of the base.

4 Claims, 8 Drawing Sheets

HARD DISK DRIVE BRACKET

BACKGROUND OF THE INVENTION

1. Field of the Invention

This invention relates generally electronic equipment, such as computers, and, more particularly, to a bracket for mounting assemblies such as disk drives in a chassis.

2. Background Information

Electronic equipment, such as computer systems, often includes subassemblies and components, such as disk drives, that are mounted in a chassis or enclosure. Various types of assemblies are used for mounting such components. Some enclosures may accommodate multiple disk drives in adjacent positions in a chassis (vertically or horizontally). Space may be required between each of the drives for the mounting hardware, such as rails, guides, and brackets. For example, if two or more disk drives having left and right side rails and guides are placed side by side in a horizontal row, space is required between the disk drives for the rails and guides. The spacing requirements of the mounting rails and guides may limit the number of disk drives that can be placed in a given width. For example, a standard size rack width may be about 19 inches. If the width of a disk drive is about 4 inches and each disk drive requires 1 inch of additional width for mounting hardware, then no more than three disk drives (5 inches per drive times 3 drives) may fit in a single horizontal row of the rack.

A leading edge of a disk drive assembly may include an electrical connector portion (e.g., a plug) that couples with a corresponding electrical connector portion (e.g., a socket) at the rear of the chassis. When the disk drive is positioned for insertion into the chassis, the connector portions may not be visible to the installer. If a disk drive is rapidly inserted into the chassis or inserted with excessive force, the contacts may be damaged (e.g., pins may be bent or permanently deformed). In addition, an installer may have limited feedback in determining whether the connectors are fully engaged.

It would be beneficial to have a bracket for a disk drive that consumes minimal space on the sides of the disk drive. It would further be beneficial to have an injector for a disk drive system that facilitates insertion of the disk drive assembly at a measured speed and indicates to a user whether the disk drive is installed. It would be further beneficial to have a bracket in which multiple elements are formed as a single unit.

SUMMARY OF THE INVENTION

In an embodiment, a bracket for a disk drive may include a base with a pair of parallel spaced rails that engage guides in a chassis. The rails may lie under the disk drive when the disk drive is coupled to the base. The rails may include plastic springs that extend laterally from the base for resiliently engaging the chassis guides. In one embodiment, a plurality of disk drive brackets are placed side by side in a horizontal row on a chassis mount.

In an embodiment, a bracket assembly for a disk drive may include an injector. The injector may be operated by a user to facilitate insertion and extraction of a disk drive assembly to and from a chassis. The injector may include a pin for engaging a slot in the chassis. The slot in the chassis may be located between the left and right sides of the bracket assembly. When the injector is rotated, the pin may engage the slot to urge the disk drive toward the rear of the chassis. A connector portion on the disk drive assembly may couple with a mating connector portion on the chassis.

In an embodiment, a bracket assembly for holding a disk drive may include elements for latching an injector at a front panel of the bracket assembly. In one embodiment, a latch element may be an integral portion of a molded base of the bracket assembly. The latch element may be coupled to a body of the base by a spring portion. The latch element may be deflectable with respect to the body of the base by squeezing a pair of tabs. In an embodiment, the latch may lock a pin of an injector in a desired position in a chassis slot to secure the disk drive in the chassis.

In an embodiment, a slot in a chassis may include a stop for a pin on a disk drive injector. During insertion of the disk drive assembly, the pin of the injector may contact the stop before an electrical connector portion on the disk drive assembly couples with a mating connector portion on the chassis. After the pin contacts the stop, the injector may be rotated to urge the disk drive assembly forward in the chassis and couple the respective connector portions of the disk drive assembly and chassis.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Reference will now be made in detail to preferred embodiments of the invention, examples of which are illustrated in the accompanying drawings. A computer or other electronic system is provided with chassis mount 20 formed with parallel sides and fabricated so as to provide spaced guides 24 for disk drive 26 or other removable component. Chassis mount 20 may be removable from the chassis or may be non-removable. Chassis mount 20 may be integrally formed in the chassis. A plurality of disk drives 26 may be installed in the chassis, the number, size and spacing thereof being subject to considerable variation. Stationary sockets 28 may be provided at the back of the chassis. Each socket 28 may be removably electrically connected to plug 29 at the rear of a corresponding disk drive 26. Disk drive 26 is also subject to considerable variation, and it will be understood that other components besides a disk drive may be used with the present invention.

Figures 1, 1A:
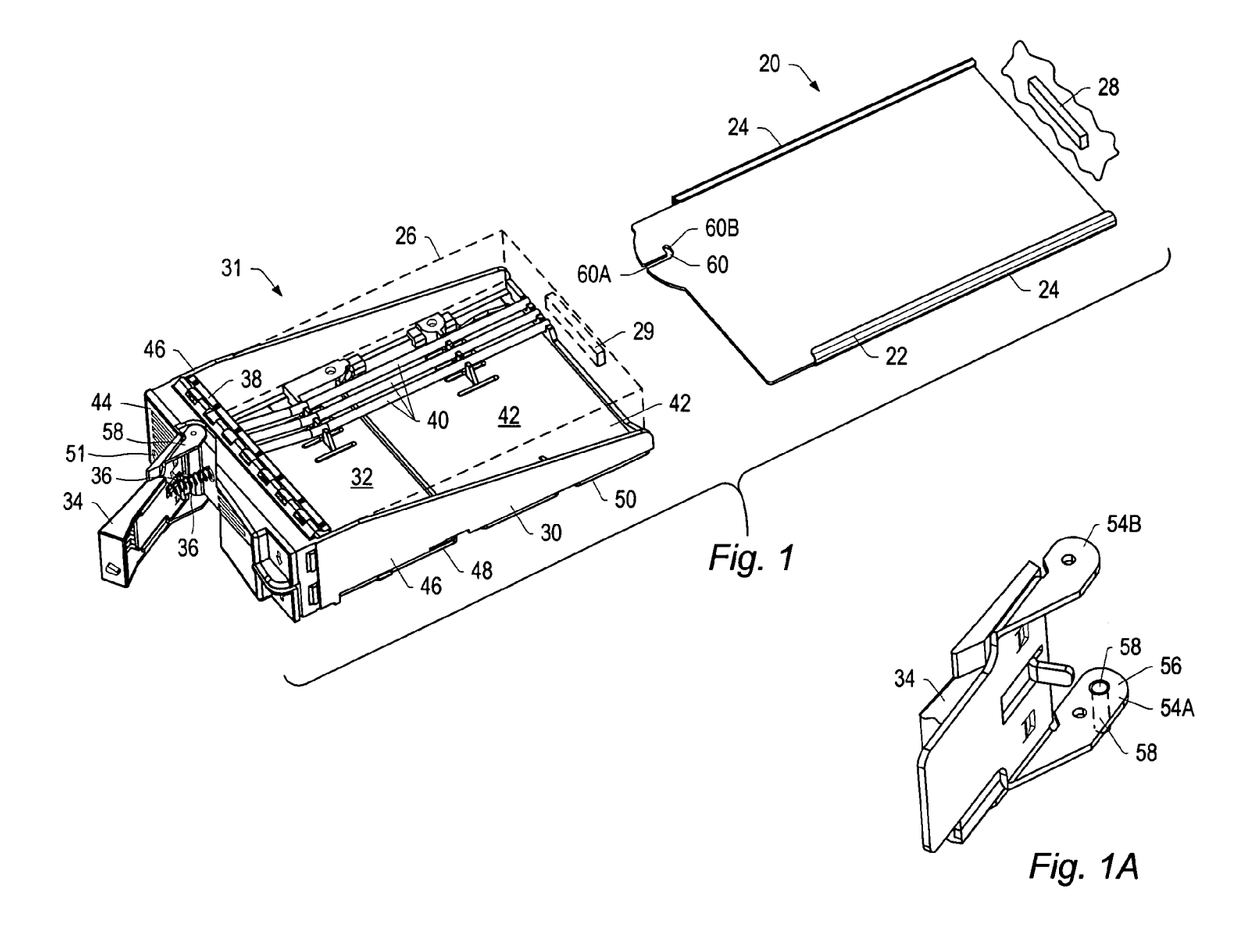
FIG. 1 depicts a bracket assembly and chassis mount.
FIG. 1A depicts a cutaway view of an injector on a bracket assembly.

FIG. 1 depicts bracket assembly 30 for holding disk drive 26. Disk drive 26 and bracket assembly 30 may couple to form disk drive assembly 31. Bracket assembly 30 may include base 32. Injector 34 may be pivotably coupled to base 32. As used herein, an "injector" includes any lever, handle, knob, shaft, screw, or other member or combination of members for at least partially inserting or extracting a disk drive or other subassembly into or out of a chassis. Coil spring 36, EMI shield 38, spring clips 39, and light pipes 40 may be installed in base 32.

Base 32 may include bottom 42, front panel 44, and left and right sides 46. Bottom 42 may include rails 48 on either side of bottom 42. Rails 48 may include lateral edges 50. Base 32 may be formed from several component parts or as an integral unit. In one embodiment, base 32 may be a single piece formed of molded plastic. Forming a base as a single piece may reduce a cost of a bracket assembly compared to one produced with a base including multiple parts. Front panel 42 may include windows 51 for allowing light signals to be displayed to a user through light pipes 40.

FIG. 1A depicts a cutaway view of injector 34. Tab 54A may include extended portion 56. Extended portion 56 may carry pin 58. Pin 58 may engage slot 60 of chassis mount 20 when bracket assembly 30 is installed in the chassis. Engagement of pin 58 with slot 60 may facilitate insertion or extraction of disk drive assembly 31 into the chassis. As used herein, "pin" includes a projecting or elongated member of any of various forms, sizes, and lengths. Pin 58 may be straight or curved, or include a combination of straight and curved sections. Pin 58 may have a cross section including, but not limited to, circular, oval, rectangular, or hexagonal. Pin 58 may be integrally formed with tab 54A or coupled to tab 54A by various methods including, but not limited to, soldering, welding, or press fitting.

Slot 60 of chassis mount 20 may include one or more sections, each of which may be curved or straight. Sections of slot 60 may be at various angles relative to chassis mount 20 or other sections of slot 60. In an embodiment, slot 60 may include longitudinal section 60A and transverse section 60B. Transverse section 60B may be perpendicular to longitudinal section 60A. Longitudinal section 60A may be parallel with guides 24 of chassis mount 20.

Figure 2:
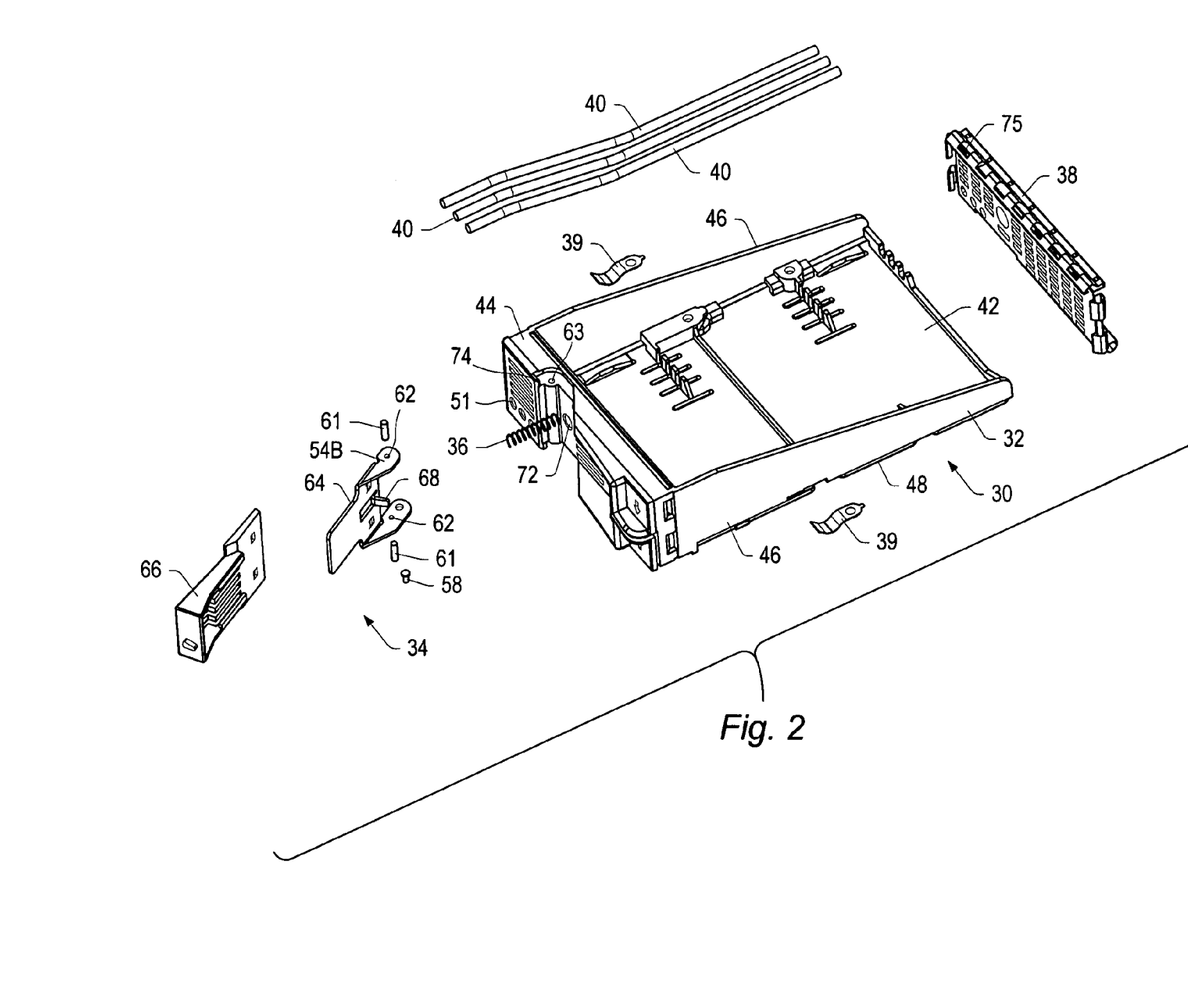
FIG. 2 depicts an exploded view of a bracket assembly.

FIG. 2 depicts an exploded view of bracket assembly 30. Injector 34 may be pivotally coupled to front panel 44 of base 32 by means of pins 61. Pins 61 may fit through holes 62 in tabs 54A of injector 34, and likewise fit into blind holes 63 in front panel 44. Injector 34 may include hinge portion 64 and grip portion 66. In an embodiment, grip portion 66 may be made of plastic and hinge portion 64 of steel. Grip portion 66 may snap into hinge portion 64. Hinge portion 64 may include retainer 68 on an interior side of injector 34. Retainer 68 may hold one end of coil spring 36 in place.

Front panel 44 of base 32 may include socket 72. Socket 72 may receive coil spring 36. Coil spring 36 may resiliently bias injector 34 away from front panel 44. Stop 74 may be provided on front panel 42. Stop 74 may inhibit injector 34 from pivoting with respect to front panel 44 beyond a predetermined range. Stop 74 may limit outward swinging of injector 34 upon release of the latch. In an embodiment, injector 34 may engage stop 74 when injector 34 is about 45° from a closed position.

Light guides 40 may snap into bottom 42. Spring clips 39 may be fastened to bottom 42 of base 32 above rails 48. EMI shield 38 may include tabs 75 for retaining EMI shield 38 in base 32. EMI shield 38 may be formed of beryllium copper or various other materials that provide electromagnetic shielding. EMI shield 38 may contain electromagnetic energy generated by hard disk drive 26. EMI shield 38 may shield disk drive 26 from electromagnetic energy produced by components surrounding the disk drive.

Figure 3:
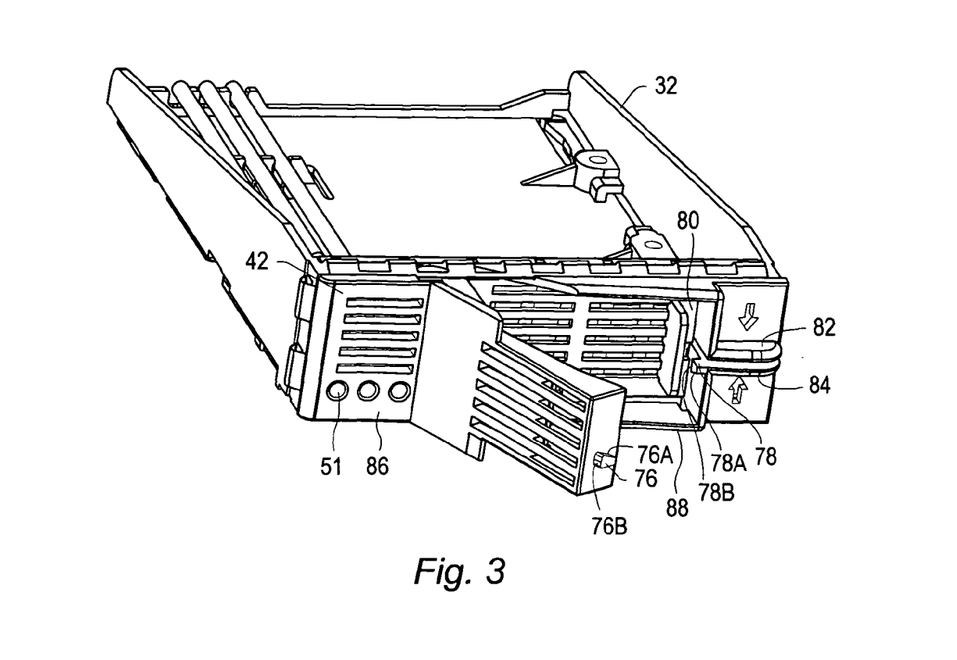
FIG. 3 depicts an isometric view of a bracket assembly including latch elements.

In an embodiment, latch elements may be provided to hold an injector in a closed position. FIG. 3 depicts a view of front panel 44 of base 32. Latch elements may include protrusion 76 and deflectable member 78. Protrusion 76 and deflectable member 78 may cooperate to latch injector 34 against the force of coil spring 36.

In an embodiment, deflectable member 78 may be included as an integral portion of a molded base. Base 32 may include tabs 82, 84. Tab 82 may be rigid with respect to body 86 of front panel 44. Tab 84 may be connected to body 86 by spring portion 88. As used herein, "spring portion" includes any resiliently deformable (e.g., bendable) member or combination of members, and includes, but is not limited to, a beam, bar, rod, coil, or combination of such elements. Spring portion 88 may allow tab 84 to move toward tab 82, causing deflectable member 78 to move upwardly. Latch elements may include various other elements known to those skilled in the art. Latch types may include, but are not limited to, a push knob latch, coil spring latch, or touch latch. In an embodiment, spring portion 88 and deflectable member 78 are integrally formed as part of base 32. Forming spring portion 88 and deflectable member 88 with base 32 may reduce a cost of producing a bracket assembly compared with a bracket assembly produced from separate parts.

Injector 34 may be placed in a closed position by rotating injector 34 into recess 80. Sloping surfaces 76A and 78A may contact each other. As injector 34 is further rotated into recess 80, sloping surfaces 76A and 78A may wedge against each other so that deflectable member 78 moves upward to allow protrusion 76 to pass deflectable member 78. As protrusion 76 passes deflectable member 78, deflectable member 78 may snap back downward under the force of spring portion 88. Surface 78B may engage surface 76B to inhibit injector 34 from pivoting away from front panel 44.

Injector 34 may be released from a closed position by operating tabs 82, 84. Tabs 82, 84 may be squeezed toward each other to cause deflectable member 78 to deflect upwardly to allow protrusion 76 to pass deflectable member 78. Injector 34 may swing outward under the influence of coil spring 36.

Figure 4:
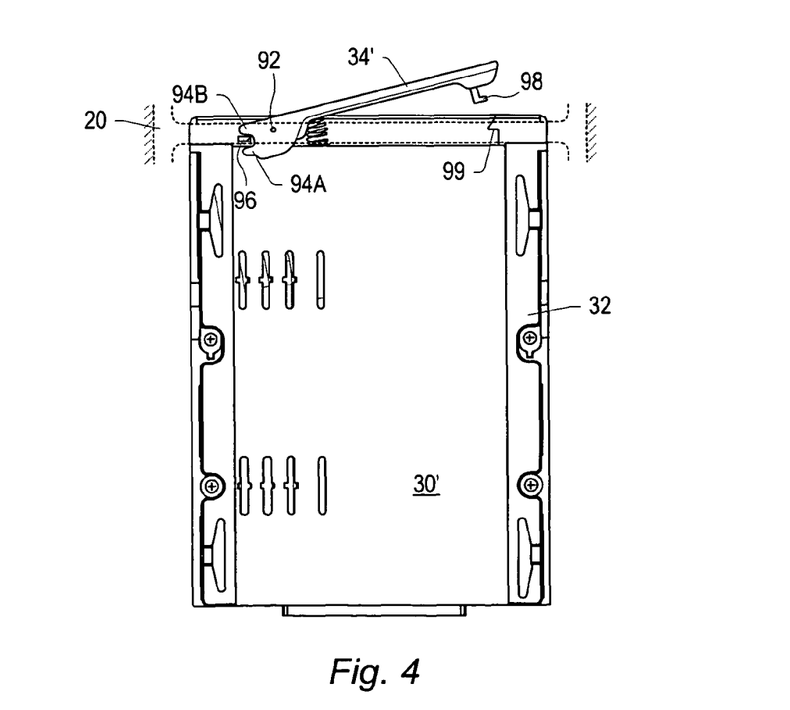
FIG. 4 depicts a bracket assembly including an injector for engaging a post on a chassis.

In another embodiment, an injector may include one or more fingers adapted to engage an element on a chassis. FIG. 4 depicts a bracket assembly 30' including injector 34' pivotably coupled to base 32' at hinge 92. Injector 34' may include fingers 94A, 94B. Fixed post 96 may be provided on a chassis mount 20. Finger 94A may engage a rear surface of post 96 to facilitate insertion of bracket assembly 30' into the chassis. Finger 94B may engage a front surface of post 96 to facilitate removal of bracket assembly 30' out of the chassis. Latch elements 98, 99 may be provided on injector 34' and base 30', respectively for latching injector 34'.

Figure 5A:
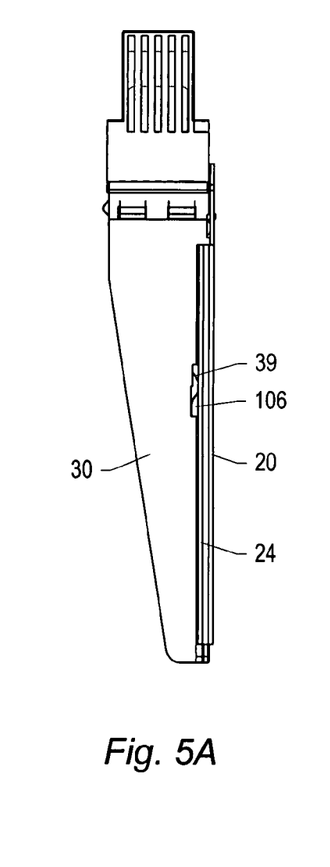
FIG. 5A depicts a bottom view of a bracket assembly.
Figure 5B:
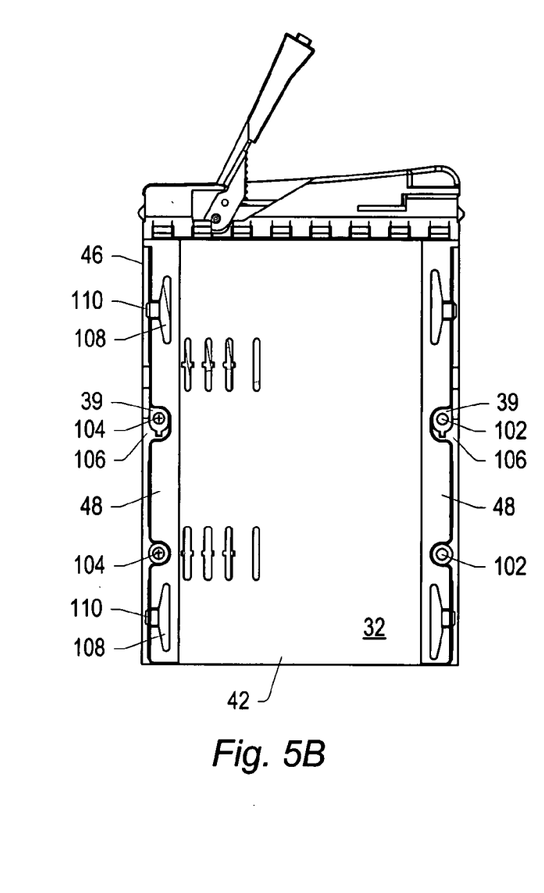
FIG. 5B depicts a side view of a bracket assembly installed in a chassis mount.

FIG. 5A depicts a side view of bracket assembly 30 installed on chassis mount 20. FIG. 5B depicts a bottom view of bracket assembly 30. Rails 48 may be located on bottom 42 between sides 46 of base 32. Bottom 42 of base 32 may include holes 102 for passage of screws 104 to make electrical and mechanical contact with the bottom of disk drive 26. Spring clips 39 may be formed of metal and curved in shape. Spring clips 39 may be held at the front and back end by screws 104 passing through holes 102 (screws 104 are not shown on the right side of FIG. 5B for clarity). Spring clips 39 may be positioned in recesses 106 formed in bottom 42. Rails 48 may include splits 108 and bulges 110. Splits 108 and bulges 110 may form a plastic spring which bias bulges 110 outwardly to resiliently engage guides 24 of chassis mount 20. Similarly, spring clips 39 may engage guides 24 of chassis mount 20 in resilient fashion. Hence, vibration of the disk drive within the chassis may be damped both vertically and horizontally. Spring clips 39 and screws 104 may establish electrical contact between chassis mount 20 and disk drive 26.

Figure 6:
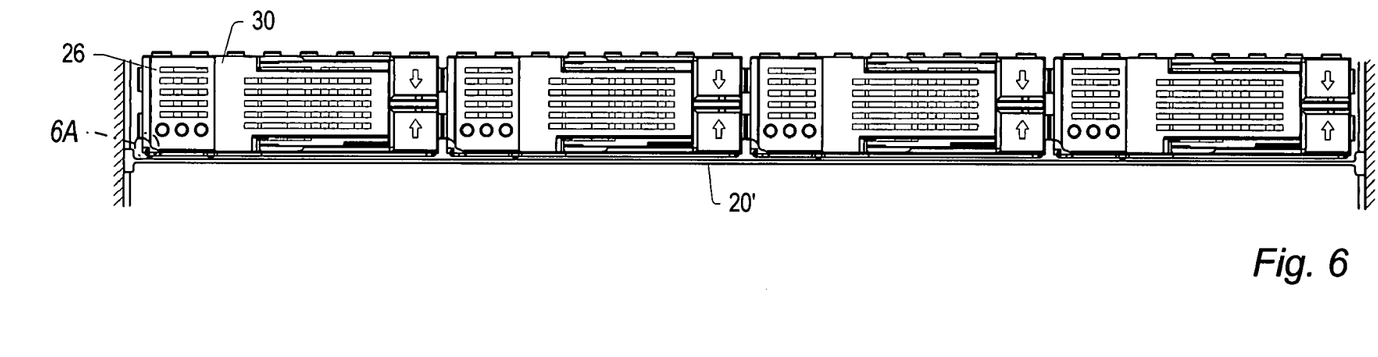
FIG. 6 depicts four disk drive assemblies on a single chassis mount.
Figure 6A:
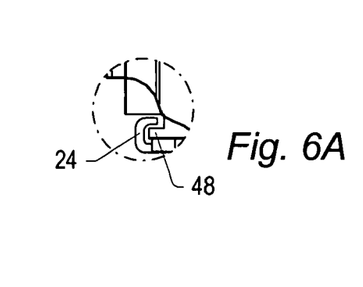
FIG. 6a is a detail view illustrating a rail on a bracket assembly positioned in a guide on a chassis mount.

In an embodiment, a plurality of disk drive bracket assemblies are placed in a single chassis mount. FIG. 6 depicts bracket assemblies 30 with disk drives 26 placed side-by-side in a horizontal row on chassis mount 20'. Placement of rails 48 under disk drives 26 may allow the sides of the bracket assemblies to abut each other and reduce spacing requirements between the disk drives. In an embodiment, four disk drives may be placed side by side in a standard 19-inch rack.

Figure 7A:
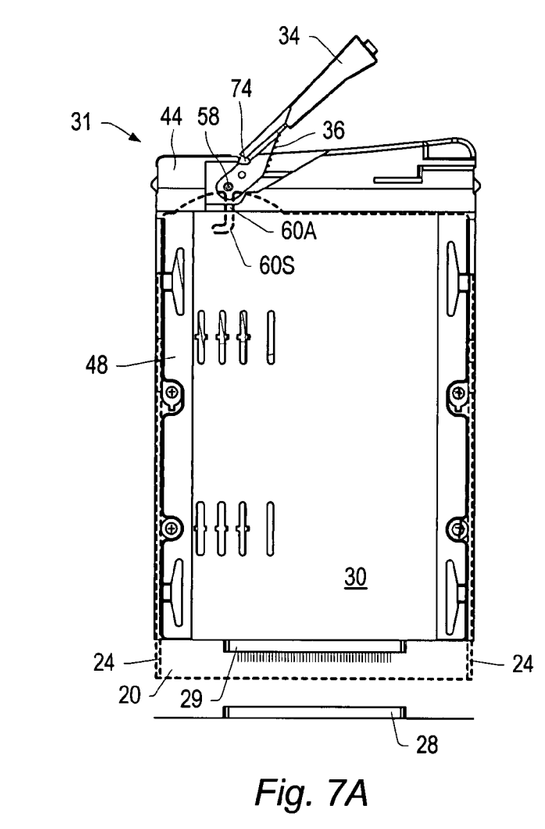
FIGS. 7A-7C depict insertion of a disk drive assembly into a chassis by rotating an injector toward the chassis.
Figure 7B:
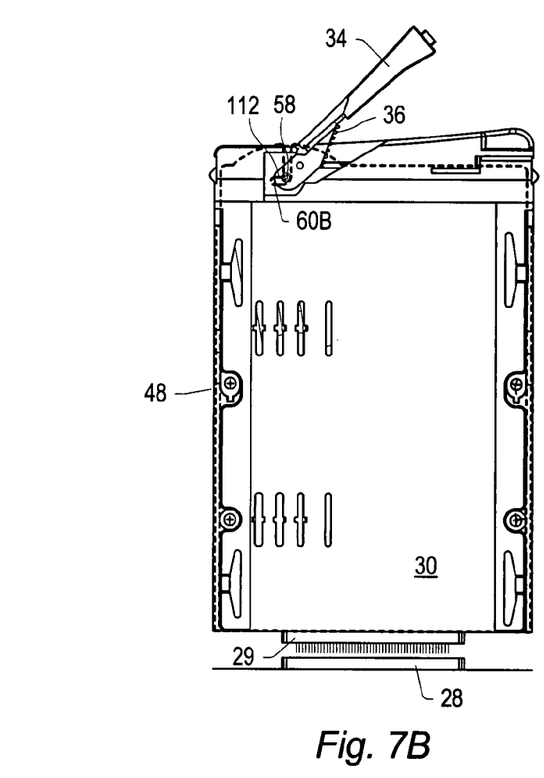
Figure 7C:
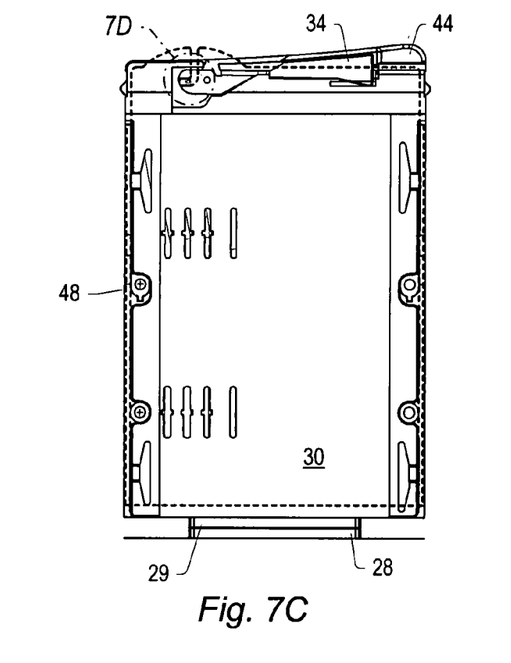

FIGS. 7A-7C depict insertion of a disk drive assembly 31 (including bracket assembly 30 and a disk drive) into chassis mount 20. The user may position disk drive assembly 31 in front of chassis mount 20 so that rails 48 are aligned with guides 24. Injector 34 may be held by stop 74 at about a 45° angle with respect to front panel 42. Pin 58 may be aligned with longitudinal section 60A of slot 60. Bracket assembly 30 may be moved forward so that rails 48 engage guides 24 of the chassis (FIG. 7A). Injector 34 may remain at a 45° angle as pin 58 slides along longitudinal section 60A of slot 60. Pin 58 may reach stop 60S at the end of longitudinal section 60A (FIG. 7B). At this point may be no electrical connection between the disk drive plug 29 and chassis socket 28. As used herein, "stop" includes any surface that at least partially inhibits movement of a member. In some embodiments, stop 60S may be a portion of a side of slot 60, such as at the corner of slot 60 shown in FIG. 1. In other embodiments, stop 60S may be an additional member that is separate from the slot.

Figure 7D:
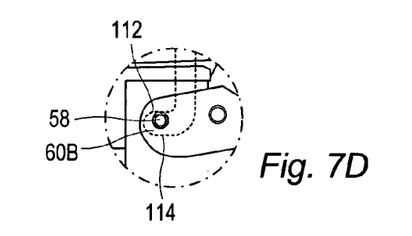
FIG. 7D depicts an installed disk drive assembly in which an injector latch has been released for removal of the disk drive assembly.

After stop 60S is reached, the user may rotate injector 34 toward front panel 42 at a measured speed. As injector 34 is rotated toward front panel 44, pin 58 may move along transverse section 60B of slot 60. Pin 58 may exert a force on forward edge 112 of transverse section 60B of slot 60 to draw bracket assembly 30 into the chassis. Plug 29 of disk drive may engage socket 28 to form an electrical connection between plug 29 and socket 28. The user may continue to rotate injector 34 until injector 34 latches against front panel 44 (FIGS. 7C-7D). Latching of injector 34 may inhibit disengagement of disk drive 26 from the chassis when the chassis is subject to shock, vibration, transportation, or assembly loads.

During both installation and removal of the drive, the speed of engagement or disengagement of socket 28 with plug 29 is controlled by swinging movement of injector 34. In addition, interaction of a pin and slot may promote a slower engagement of plug 29 and socket 28. A slower engagement of the plug and socket may inhibit damage to the contacts of the plug and socket. For example, stop 60S may inhibit a user from rapidly pushing bracket assembly 30 into the chassis and impacting the plug contacts with the socket contacts at a high speed. Contact of pin 58 with stop 60S may provide a user with a clear signal that a plug and socket are about to engage. In addition, because a user must perform a separate operation (e.g., rotating injector 34) to complete engagement of the plug and socket, the user may exercise additional care when rotating the injector 34.

Figure 7E:
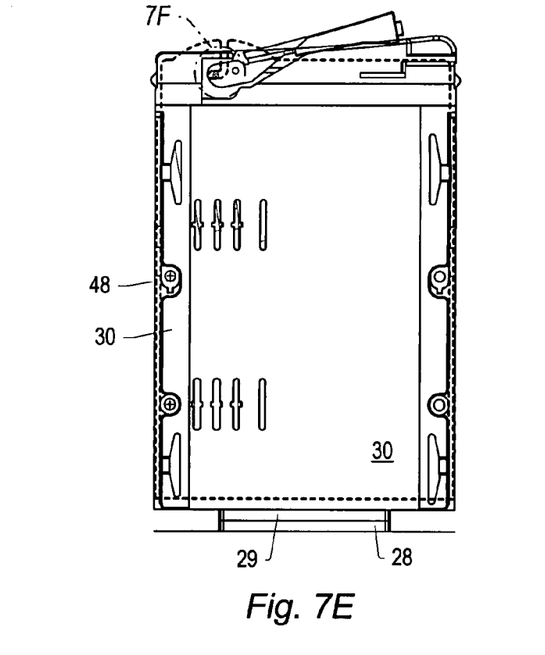
FIGS. 7E-7F depict the position of an injector and pin when the injector has been opened for removing a disk drive assembly from a chassis.
Figure 7F:
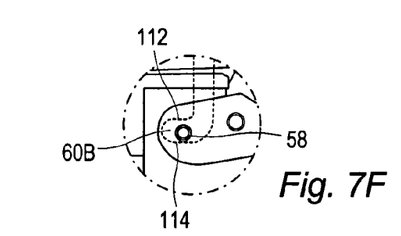

To remove disk drive assembly 31, the user first releases injector 34. Spring 36 may cause injector 34 to open about 15° as pin 58 moves from forward edge 112 of transverse section 60B to rear edge 114 of transverse section 60B (FIGS. 7E-7F). Contact with rear edge 114 may stop swinging movement of injector 34. The user may continue to rotate injector 34 to away from front panel 42. As injector 34 is rotated away from front panel 42, pin 58 may exert a force on rear edge 114 of transverse section 60B to push disk drive assembly 31 away from the chassis and disengage plug 29 from socket 28. Pin 58 may reach longitudinal section 60A of slot 60 (FIG. 7B). Injector 34 may be rotated to an open position. Disk drive assembly 31 may be withdrawn from the chassis until pin 58 clears slot 60 (FIG. 7A) and further withdrawn until disk drive assembly 31 is removed from the chassis.

In some embodiments, interaction between a pin and slot may provide a user with feedback as to whether a disk drive assembly is properly installed. For example, pin 58 may not align with longitudinal section 60A of slot 60 when injector 34 is in a closed position. If a user attempts to push an uninstalled disk drive assembly forward on a chassis when the injector is in a closed position, the user will be prevented from doing so because the pin will block forward movement of the disk drive assembly into the chassis. The user may thus be warned that the injector must be released to an open position and the disk drive properly installed. As another example, when injector 34 is in an open position, a user may be provided with an indication that the disk drive assembly is not installed (e.g., the pin has not entered the slot or the pin is in longitudinal section 60A of slot 60).

Figure 8A:
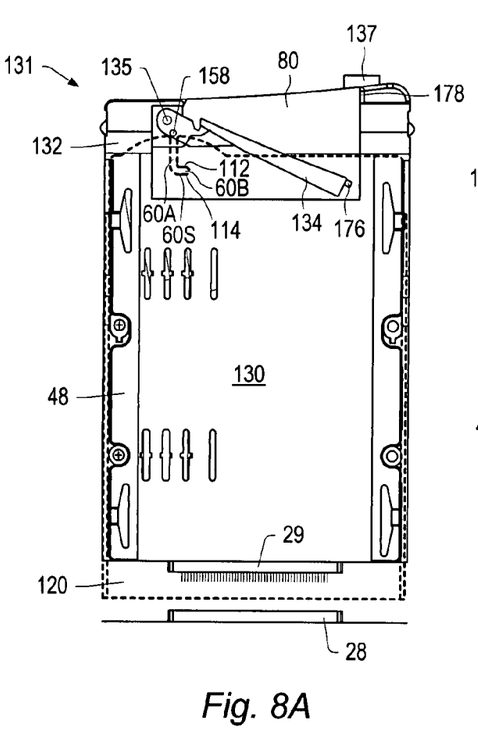
FIGS. 8A-8C depict insertion and removal of a disk drive assembly into a chassis mount by rotating an injector away from the chassis.
Figure 8B:
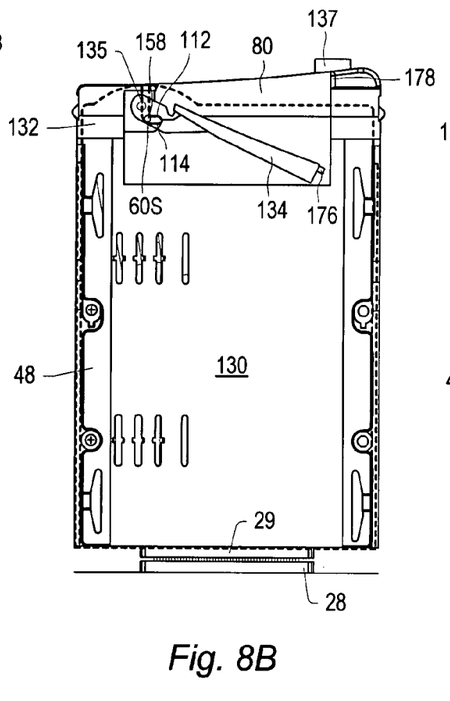
Figure 8C:
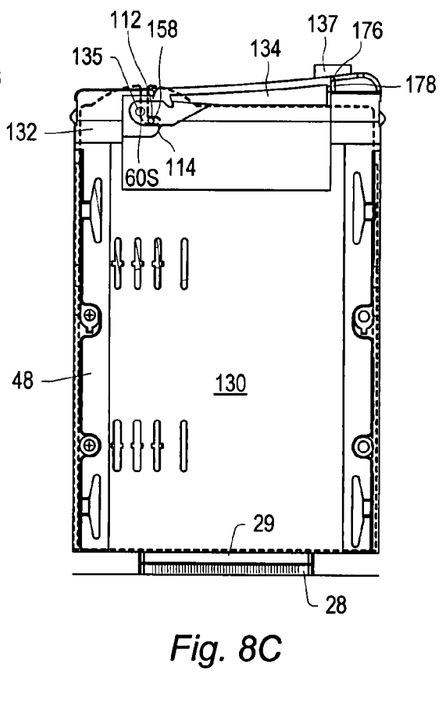

In an embodiment, a bracket assembly may facilitate insertion of a bracket assembly when an injector is rotated away from the rear of a chassis. FIGS. 8A-8C depict insertion of disk drive assembly 131 into chassis mount 20. Disk drive assembly 131 may include bracket assembly 130. Injector 134 may be pivotably coupled to base 132 at hinge 135 in recess 180 of base 132. Thumb rest 137 may be provided on base 132. Pin 158 may be provided on injector 134. In some embodiments, a grip portion of injector 134 may have a forward-most position that is aligned with the front panel of disk drive assembly 131, rather than in recess 180.

A user may initially position disk drive assembly 131 on guides 124 (FIG. 8A). Disk drive assembly 131 may be advanced along longitudinal section 60A of slot 60 until pin 158 reaches stop 60S (FIG. 8B). The user may grasp injector 134 with the user's fingers and rotate injector 134 outwardly so that pin 158 engages rear edge 112 of transverse section 60B to draw disk drive assembly 131 into the chassis. As injector 134 is rotated, disk drive plug 29 may couple with chassis socket 28. Injector 134 may be further rotated until latch elements 176, 178 engage to latch injector 134 (FIG. 7C). To remove disk drive assembly 131, injector 134 may unlatched. Injector 134 may be rotated forward to engage pin 158 against rear edge 114 of slot portion 60B. Pin 158 may exert a force against rear edge 114 to eject disk drive assembly 131 from the chassis.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims. For example, when the terms "vertical," "horizontal" "upward", "downward," "under", "over," "left," or "right" are used in the claims, they are to be understood to relate to the Figures as illustrated. However, the device may be turned at an angle to the horizontal or inverted with the quoted terms referring to the altered orientation.

What is claimed is:

1. A bracket comprising:
a base adapted to hold a disk drive, the base comprising a pair of rails adapted to slidably engage a pair of guides in a chassis mount,
wherein the rails are adapted to lie under the disk drive when the disk drive is coupled to the base; and
an injector pivotably coupled to the base, the injector comprising a pin adapted to engage a slot in the chassis mount to urge the disk drive toward the rear of the chassis mount when the injector is moved toward a first position; and
a first latch element coupled to the injector, and a second latch element coupled to the base, wherein the latch elements are adapted to selectively couple with each other to hold the injector.

2. A system for mounting a disk drive comprising:
a chassis mount comprising a pair of guides and a slot, and
a first bracket comprising:
a base adapted to hold a disk drive; the base comprising a pair of rails adapted to slidably engage the guides, wherein the rails are adapted to lie under the disk drive when the disk drive is coupled to the base; and
an injector pivotably coupled to the base, the injector comprising a pin adapted to engage the slot in the chassis mount to urge the disk drive toward the rear of the chassis mount when the injector is moved toward a first position;
wherein the slot in the chassis mount comprises a stop, wherein the pin is adapted to contact a stop in the slot after the pin has advanced through a first section of the slot, wherein the injector is adapted to move the pin through a second section of a slot after contacting stop to urge a connector portion on the disk drive to couple with a connector portion coupled to the chassis mount.

3. A bracket comprising:
a base adapted to hold a disk drive, the base comprising a pair of rails adapted to slidably engage a pair of guides in a chassis mount,
wherein the rails are adapted to lie under the disk drive when the disk drive is coupled to the base; and
an injector pivotably coupled to the base, the injector comprising a pin adapted to engage a slot in the chassis mount to urge the disk drive toward the rear of the chassis mount when the injector is moved toward a first position;
wherein the pin is adapted to contact a stop in the slot after the pin has advanced through a first section of the slot, wherein the injector is adapted to move the pin through a second section of a slot to urge a connector portion on the disk drive to couple with a connector portion coupled to the chassis mount.

4. A system for mounting a disk drive comprising:
a chassis mount comprising a pair of guides and a slot, and
a first bracket comprising:
a base adapted to hold a disk drive; the base comprising a pair of rails adapted to slidably engage the guides, wherein the rails are adapted to lie under the disk drive when the disk drive is coupled to the base; and
an injector pivotably coupled to the base, the injector comprising a pin adapted to engage the slot in the chassis mount to urge the disk drive toward the rear of the chassis mount when the injector is moved toward a first position;
wherein the slot in the chassis mount is substantially L-shaped, wherein the pin is adapted to contact a stop in the substantially L-shaped slot when the pin has advanced through a first leg of the substantially L-shaped slot, wherein the injector is adapted to move the pin through at least a portion of the second leg of the substantially L-shaped slot to urge a connector portion on the disk drive to couple with a connector portion coupled to the chassis mount.

* * * * *